(12) United States Patent
Kasai et al.

(10) Patent No.: US 11,440,222 B2
(45) Date of Patent: Sep. 13, 2022

(54) METHODS FOR MANUFACTURING CARBON FIBER AND FOR MANUFACTURING CARBON FIBER REINFORCED RESIN COMPOSITION

(71) Applicant: Ai-Carbon Co., Ltd., Hachinohe (JP)

(72) Inventors: Yuki Kasai, Hachinohe (JP); Noriaki Ijuin, Hachinohe (JP)

(73) Assignee: AI-CARBON CO., LTD., Hachinohe (JP)

( * ) Notice: Subject to any disclaimer, the term of this patent is extended or adjusted under 35 U.S.C. 154(b) by 683 days.

(21) Appl. No.: 16/371,541

(22) Filed: Apr. 1, 2019

(65) Prior Publication Data

US 2019/0283279 A1 Sep. 19, 2019

(30) Foreign Application Priority Data

Feb. 9, 2018 (JP) .............................. JP2018-022052

(51) Int. Cl.
*B29B 17/00* (2006.01)
*B32B 27/00* (2006.01)
(Continued)

(52) U.S. Cl.
CPC ............. *B29B 17/021* (2013.01); *B32B 27/12* (2013.01); *B32B 27/32* (2013.01); *B32B 27/34* (2013.01);
(Continued)

(58) Field of Classification Search
CPC ....... B29B 17/00; B32B 17/02; B32B 17/021; B32B 27/00; B32B 27/10; B32B 27/12;
(Continued)

(56) References Cited

U.S. PATENT DOCUMENTS

2017/0350040 A1  12/2017  Ijuin

FOREIGN PATENT DOCUMENTS

EP         3178874 A1    6/2017
JP        2001172426 A    6/2001
(Continued)

OTHER PUBLICATIONS

Effect of acid addition in the recycling of nitric acid of Umeda, SCEI 75th Annual Meeting, p. 298 (2010).
(Continued)

*Primary Examiner* — Jacob T Minskey
*Assistant Examiner* — Matthew Hoover
(74) *Attorney, Agent, or Firm* — Panitch Schwarze Belisario & Nadel LLP (57) ABSTRACT

A method for manufacturing a carbon fiber is provided which involves: (1) immersing a carbon fiber composite material (CFC) in an acidic aqueous solution to elute at least a part of a resin component of the CFC, to thereby obtain a substantially fibrous product; and (2) immersing the substantially fibrous product obtained in step (1) in an alkaline aqueous solution to elute at least a part of a resin component of the substantially fibrous product, to thereby obtain a fibrous product. A method for manufacturing a carbon fiber reinforced resin composition is provided which involves manufacturing a carbon fiber by the above method and manufacturing a carbon fiber reinforced resin composition using the resulting carbon fiber. Using these methods, it is possible to recover and recycle a carbon fiber from a carbon fiber composite material (CFC) at a low cost without deteriorating the carbon fiber.

12 Claims, 3 Drawing Sheets

(A) Electrolysis method (B) The inventive method (sample No. 4)

(51) Int. Cl.
    *B29B 17/02*     (2006.01)
    *B32B 27/38*     (2006.01)
    *B32B 27/32*     (2006.01)
    *B32B 27/34*     (2006.01)
    *B32B 27/12*     (2006.01)
    *B32B 27/36*     (2006.01)
    *B29K 307/04*     (2006.01)

(52) U.S. Cl.
    CPC ............ *B32B 27/365* (2013.01); *B32B 27/38* (2013.01); *B29K 2307/04* (2013.01); *B29K 2863/00* (2013.01); *B32B 2262/106* (2013.01)

(58) Field of Classification Search
    CPC ......... B32B 27/30; B32B 27/32; B32B 27/34; B32B 27/36; B32B 27/365; B32B 27/38
    See application file for complete search history.

(56) References Cited

FOREIGN PATENT DOCUMENTS

| | | |
|---|---|---|
| JP | 2005255835 A | 9/2005 |
| JP | 2005255899 A | 9/2005 |
| JP | 2007297641 A | 11/2007 |
| JP | 2009138143 A | 6/2009 |
| JP | 2011074204 A | 4/2011 |
| JP | 2013064219 A | 4/2013 |
| JP | 2013107973 A | 6/2013 |
| JP | 2013249386 A | 12/2013 |
| JP | 6044946 B2 | 12/2016 |
| JP | 201725312 A | 2/2017 |
| JP | 6205510 B2 | 9/2017 |
| JP | 2017160559 A | 9/2017 |
| WO | 2009072651 A1 | 6/2009 |

OTHER PUBLICATIONS

Extended European Search Report dated Nov. 19, 2020 in EP Application No. 19168197.2.
Kubouchi, M., "Corrosion/Degradation Behavior of Epoxy Resin Depend on Chemical Structure," vol. 46, No. 11, pp. 1-6 (2010).
Lee et al., "Circulating flow reactor for recycling of carbon fiber from carbon fiber reinforced epoxy composite," Korean Journal of Chemical Engineering, vol. 28, No. 1, pp. 449-454 (2011).
Liu et al., "Recycling of Carbon/Epoxy Composites," Journal of Applied Polymer Science, vol. 95, pp. 1912-1916 (2004).
Ma et al., "Recycling of Carbon Fiber Composites Using Chemical Treatment: Reaction Characterization and Optimization," ResearchGate, pp. 1-15 (2017).
Office Action dated Feb. 15, 2022 in JP Application No. 2018022052.
Third Party Observation dated Feb. 16, 2021 in JP Application No. 2018022052.
Tsuda et al., "Decomposition of Polymeric Materials," Zairyo-to-Kankyo, vol. 44, No. 2, pp. 104-111 (1995) (English Abstract).
Yin et al., "Hydrothermal decomposition of brominated epoxy resin in waste printed circuit boards," Journal of Analytical and Applied Pyrolysis, vol. 92, pp. 131-136 (2011).

(A) Electrolysis method (B) The inventive method (sample No. 4)

(C) The inventive method (sample No. 6)

Fig. 4

(A) Electrolysis method (B) The inventive method (sample No. 4)

METHODS FOR MANUFACTURING CARBON FIBER AND FOR MANUFACTURING CARBON FIBER REINFORCED RESIN COMPOSITION

CROSS-REFERENCE TO RELATED APPLICATION

This application claims priority under 35 U.S.C. § 119(b) to Japanese Application No. 2018-022052, filed Feb. 9, 2018, the disclosure of which is incorporated by reference herein in its entirety.

TECHNICAL FIELD

The present invention relates to methods for manufacturing a carbon fiber and for manufacturing a carbon fiber reinforced resin composition. More particularly, the present invention relates to methods for manufacturing a recycled carbon fiber and for manufacturing a carbon fiber reinforced resin composition.

BACKGROUND ART

A carbon fiber has attracted attention as a lightweight and high-strength material, and has been used as a carbon fiber composite material of a material combined using a binder such as a resin.

The carbon fiber composite materials comprise a carbon fiber reinforced plastic (CFRP) obtained by combining a carbon fiber and a resin, a carbon fiber reinforced cement (CFRC) comprising cement combined therein, and the like, and have been widely used for materials for aircraft and automobile, sporting goods, and the like. This leads up to the improvement of fuel efficiency due to weight reduction, and the like, and therefore the market is considered to increasingly expand hereafter. Meanwhile, the disposal of step excess materials or discarded materials has become a problem, leading to a study on a recycling technology of isolating and recovering a carbon fiber from a carbon fiber composite material.

However, a carbon fiber composite material is very stable and is difficult to decompose and reuse because of the stability. Currently, the recycling technology of discarded materials has not sufficiently established in terms of performances and cost. Accordingly, it is considered that, when the carbon fiber included in a discarded material can be recycled at a low cost and with the quality equivalent with that of a virgin carbon fiber, the market will expand in the future to various fields in which such carbon fibers have not been utilized heretofore. Further, the discarded materials to be subjected to a landfill or incineration disposal are also reduced in amount, and hence the environmental load is also reduced.

As the method for recycling a carbon fiber from a discarded material, a thermal decomposition method (PTL 1), a normal pressure dissolution method (PTL 2 to 5), an electrolysis method (PTL 6 and 7), or the like has been studied heretofore, but actually has not yet been practically well used because of the high cost and the insufficient performances.

[PTL 1] Japanese Patent Application Publication No. 2013-064219
[PTL 2] Japanese Patent Application Publication No. 2005-255835
[PTL 3] Japanese Patent Application Publication No. 2005-255899
[PTL 4] Japanese Patent Application Publication No. 2005-255899
[PTL 5] Japanese Patent Application Publication No. 2007-297641
[PTL 6] Japanese Patent No. 6044946
[PTL 7] Japanese Patent No. 6205510

The contents of PTL 1 to 7 are hereby incorporated by reference in its entirety particularly as disclosure.

SUMMARY OF INVENTION

With the thermal decomposition method described in PTL 1, superheated steam is supplied, and high-temperature burning is performed at 400° C. or more in a heating furnace, to thereby decompose a base material resin. With this method, the carbon fiber is deteriorated by the heat treatment, and the mechanical strength of the regenerated carbon fiber remains at 80% of that of a virgin carbon fiber. This is described in Example 1.

The normal pressure dissolution methods described in PTL 2 to 5 are each a method for dissolving the base material resin at around 200° C. using a specific cracking catalyst, an alkali metal, and a specific organic solvent, and separating a carbon fiber. With the methods, thermal deterioration of the carbon fiber is less caused, equipment for solvent recovery, and the like, is necessary since an organic solvent is used, resulting in a higher manufacturing cost.

The electrolysis method described in PTL 6 requires a burning step at 400° C. to 500° C. as the pretreatment of electrolysis as with the thermal decomposition method (see Example 2). Further, in Example 4, the mechanical strength was measured, and the strength was slightly lower than that of the resin not comprising any carbon fiber. Thus, a sizing agent was required for improving the conformability with the resin.

PTL 7 is a method for obtaining a high-strength regenerated carbon fiber by a heat burning treatment within a specific condition and an electrolysis condition within a specific condition. However, in Example 2, the mechanical strength of the composite resin (No. 119 or 121) obtained by adding the regenerated carbon fiber (sample No. 37 or 38), which was subjected only to a heat treatment, to a PBT (polybutylene terephthalate) resin was lower than that of a virgin carbon fiber. The mechanical strength was improved by introducing a proper amount of a chemical functional group into the carbon fiber surface by the electrolysis after the heat treatment.

From the description of the Patent Literature, it is apparent that the mechanical strength of a carbon fiber or a composite material thereof is reduced by a heat treatment of CFRP at 400° C. or more, or an electrolysis treatment under other conditions than proper conditions. Meanwhile, the method for performing a dissolution treatment at low temperatures using an organic solvent in order to avoid deterioration of the carbon fiber for the recycling treatment of CFRP requires solvent recovery equipment, a specific compound, and the like, resulting in a higher manufacturing cost.

Wide expansion of the use of a carbon fiber requires a recycled carbon fiber capable of being at a low cost and keeping the strength inherent in a carbon fiber. This incurs a demand for the development of a manufacturing method therefor.

Under such circumstances, it is an object of the present invention to provide a method for recovering and recycling a carbon fiber from a carbon fiber composite material (CFC) at a low cost without deteriorating the carbon fiber.

The present inventors have conducted various studies, have found a method capable of decomposing a resin without deteriorating a carbon fiber using acidic and alkaline aqueous solutions without heating CFC at high temperatures, and recovering only the carbon fiber, and have completed the present invention.

The present invention is as follows.

[1] A method for manufacturing a carbon fiber, comprising:

a step (1) of immersing a carbon fiber composite material (CFC) in an acidic aqueous solution to elute at least a part of a resin component of the CFC, to thereby obtain a substantially fibrous product; and a step (2) of immersing the substantially fibrous product obtained in the step (1) in an alkaline aqueous solution to elute at least a part of a resin component of the substantially fibrous product, to thereby obtain a fibrous product.

[2] The manufacturing method according to [1], wherein the elution amount of the resin component in the step (1) falls within the range of 0.1 to 99.9 when the mass of the CFC before immersion is taken as 100.

[3] The manufacturing method according to [1] or [2], wherein the elution amount of the resin component in the step (2) falls within the range of 0.1 to 99.9 when the mass of the CFC before immersion is taken as 100.

[4] The manufacturing method according to any one of [1] to [3], wherein a part of or the whole of the substantially fibrous product is fibrous.

[5] The manufacturing method according to any one of [1] to [4], wherein the CFC is an uncured prepreg or a cured prepreg.

[6] The manufacturing method according to any one of [1] to [4], wherein the CFC is an uncured prepreg and is immersed in the acidic aqueous solution until a part of the uncured prepreg is decomposed into a fibrous state in the step (1), to thereby obtain a substantially fibrous product.

[7] The manufacturing method according to any one of [1] to [4], wherein the CFC is a cured prepreg, and is immersed in an acidic aqueous solution until the whole of the cured prepreg is decomposed into a fibrous state in step (1), to thereby obtain a substantially fibrous product.

[8] The manufacturing method according to any one of [1] to [7], further comprising a step (3) of immersing the fibrous product obtained in the step (2) in an acidic aqueous solution to elute further a resin component and/or a sizing agent deposited on the fibrous product, to thereby obtain a fibrous product improved in water dispersibility.

[9] A method for manufacturing a carbon fiber reinforced resin composition, comprising the steps of: manufacturing a carbon fiber by the method according to any one of [1] to [8]; and manufacturing a carbon fiber reinforced resin composition using the resulting carbon fiber.

[10] The manufacturing method according to [9], wherein the carbon fiber reinforced resin composition is a resin composition comprising a carbon fiber, and a thermoplastic resin and/or a thermosetting resin, the carbon fiber reinforced resin composition comprising a carbon fiber (A) in an amount of 5 to 95 mass %, and a thermoplastic resin and/or a thermosetting resin (B) in an amount of 5 to 95 mass % when the total amount of the carbon fiber (A) and the thermoplastic resin and/or thermosetting resin (B) is taken as 100 mass %.

[11] The manufacturing method according to [10], wherein the thermoplastic resin is at least one selected from the group consisting of polyolefin-based resins, polyamide-based resins, styrene-based resins, polycarbonate-based resins, polyester-based resins, polyphenylene ether resins, polyphenylene sulfide resins, polyacetal resins, acrylic resins, and vinyl chloride resins.

[12] The manufacturing method according to [10], wherein the thermosetting resin is at least one selected from the group consisting of epoxy resins, phenol resins, melamine resins, urea resins, diallyl phthalate resins, and unsaturated polyester resins.

Advantageous Effects of Invention

The present invention can provide a carbon fiber recycled by an unconventional new carbon fiber recycling method, and a resin composition having unconventional excellent mechanical physical properties by using the same.

DESCRIPTION OF EMBODIMENTS

[Manufacturing Method of Carbon Fiber]

A method for manufacturing a carbon fiber of the present invention comprises: a step (1) of immersing a CFC in an acidic aqueous solution for eluting at least a part of the resin component of the CFC, to thereby obtain a substantially fibrous product; and a step (2) of immersing the substantially fibrous product obtained in the step (1) in an alkaline aqueous solution for eluting at least a part of a resin component of the substantially fibrous product, to thereby obtain a fibrous product.

Step (1)

A CFC is immersed in an acidic aqueous solution for eluting at least a part of the resin component of the CFC, to thereby obtain a substantially fibrous product. Although not particularly limited, the CFC is a composite material obtained by combining a carbon fiber and a thermosetting resin, and may be either an uncured prepreg before curing a thermosetting resin, or a cured prepreg. The uncured prepreg can be a product recovered as lumber remnants, defective products, or the like, which is generated in the process of manufacturing a CFC product. The cured prepreg may be a used CFC such as a carbon fiber reinforced plastic (CFRP), or lumber remnants, defective products or the like generated in the process of manufacturing. They are matters mainly burned or buried as a discarded material heretofore.

The CFC to be subjected to the step (1) is not particularly limited on the shape, the dimensions, and the like, and is preferably previously cut or the like to a given dimension or smaller in view of ease of elution, or ease of operation of stirring or movement in a solution of the resin component of the CFC. However, when the dimension is made too small, the dimension (length) of the inherent carbon fiber is necessary to be made small. For this reason, the dimension is preferably appropriately determined in consideration of the dimension of the carbon fiber to be recovered. Practically, for example, a piece can have a dimension within the range of 0.2 to 10 cm per side. However, it is not intended that the dimension is limited to this range.

The acidic aqueous solution to be used in the step (1) is not particularly limited. As an acid, an organic acid, an inorganic acid, or a mixture thereof can be used. Examples of the organic acids may include formic acid, acetic acid, citric acid, and the like. Examples of the inorganic acid may include nitric acid, sulfuric acid, hydrochloric acid, and phosphoric acid. The inorganic acid is at least one or more of nitric acid and sulfuric acid. This is favorable in terms of the solubility of the resin component included in the CFC, and is preferable because of the low cost and easy availability. The acidic aqueous solution can be appropriately determined in consideration of the kind or the treatment conditions (mainly, the treatment temperature and time) of the CFC to be treated.

The concentration of the acid in the acidic aqueous solution can be appropriately determined in consideration of the kind of the acid, the kind, the dissolution temperature, the dissolution time of the CFC, and the like, can be set, for example, within the range of 0.01 to 10 M, preferably within the range of 0.1 to 10 M, in particular preferably within the range of 1 to 10 M, and most preferably within the range of 2 to 8 M. The temperature of the acidic aqueous solution can be set within the range of 10° C. to 100° C., and preferably falls within the range of 30° C. to 90° C., and more preferably within the range of 50° C. to 90° C. because of the particular effectiveness in terms of the solubility of the resin.

When the CFC is an uncured prepreg, the thermosetting resin is before curing, and the decomposition by an acid and subsequent alkali (swelling and/or dissolution of the resin and/or the sizing agent) can be performed relatively easier. In the step (1), the CFC is preferably immersed in an acidic aqueous solution until a part of the uncured prepreg is decomposed into fibrous state, to thereby elute the resin component included in the CFC, so as to obtain a substantially fibrous product. This is because a composite material can be sufficiently decomposed into a fibrous state with the alkali aqueous solution in the step (2) when the composite material is decomposed by dissolving the resin and/or the sizing agent included in the CFC and/or swelling to a substantially fibrous product which is partially fibrous.

The elution amount of the resin component in the step (1) can fall within the range of, for example, 0.1 to 99.9, preferably within the range of 1 to 95, and more preferably within the range of 5 to 90 when the mass of the CFC before immersion is taken as 100.

When the CFC is a cured prepreg, the thermosetting resin has already been cured. Thus, such a CFC is more difficult to decompose in the subsequent decomposition procedure with an alkali than the uncured prepreg. In the step (1), the CFC is immersed in an acidic aqueous solution until the whole of the cured prepreg is decomposed into a fibrous state to be a substantially fibrous product, to thereby elute the resin component, to obtain a substantially fibrous product. The state in which the whole of the cured prepreg has been decomposed into a fibrous state can be judged by, for example, repeating washing with water after dissolution, and visually observing that the carbon fiber is in a wool shape. The decomposition of the whole of the cured prepreg into a fibrous state can be carried out by elongating the immersion time in the acidic aqueous solution even under the same concentration and temperature conditions as compared with the decomposition of the uncured prepreg. Further, by setting the concentration and the temperature of the acid higher, it is possible to shorten the immersion time.

The substantially fibrous product obtained in the step (1) of the present invention means a matter in which part of the CFC is made fibrous or a matter in which the whole of the CFC is made fibrous but still includes residues of the resin remained in the fibrous product. Even when the matter in this state is further immersed in an acidic aqueous solution for a long time, the residue of the resin and the like are difficult to be further removed.

Step (2)

The substantially fibrous product obtained in the step (1) is immersed in an alkaline aqueous solution, to obtain a fibrous product fully made fibrous. It is difficult to remove residues of the resin, and the like, from the substantially fibrous product obtained in the step (1). Even if the substantially fibrous product is further immersed in the acidic aqueous solution for a long time, it is also difficult to remove residues of the resin, and the like. On the contrary, it is possible to remove the residue of the resin, and the like relatively easily from the substantially fibrous product obtained in the step (1) by immersing the substantially fibrous product in an alkaline aqueous solution.

For the alkaline aqueous solution, examples thereof may include aqueous solutions containing alkali such as a hydroxide, carbonate, hydrogen carbonate, sulfate, sulfite, nitrate, or the like of an alkali metal, a hydroxide, carbonate, hydrogen carbonate, sulfate, sulfite, nitrate, or the like of an alkaline-earth metal, or an amine compound. Examples of the alkali metals may include lithium, sodium, potassium and the like, and examples of the alkaline-earth metals may include beryllium, magnesium, calcium, and the like. Further, examples of amine compounds may include dimethylamines, diethylamines, and the like. In consideration of the solubility in water, ease of availability, and the like, sodium or potassium is preferably used. Because of being particularly good in terms of solubility of the resin, at least one or more of sodium hydrogen carbonate, sodium hydroxide, and sodium sulfite is in particular preferably used.

The concentration of alkali in the alkaline solution can be appropriately determined in consideration of the kind of alkali, the kind of the CFC, the state, the dissolution temperature, the dissolution time of the substantially fibrous product, and the like, and, for example, can be set within the range of 0.01 to 10 M, and preferably falls within the range of 0.1 to 10 M. Note that 10% NaOH is 2.5 M. The temperature of the alkaline solution during dissolution can be set within the range of 5° C. to 100° C., and preferably falls within the range of 20° C. to 80° C. because of being particularly effective in terms of the solubility of the resin.

The elution amount of the resin component in the step (2) falls, for example, within the range of 0.1 to 99.9, preferably within the range of 1 to 95, and more preferably 5 to 90 when the mass of the CFC before immersion is taken as 100.

The manufacturing method of the present invention can further comprise a step (3) of immersing the fibrous product obtained in the step (2) in an acidic aqueous solution for further eluting the resin component and/or the sizing agent deposited on the fibrous product, and the like, to thereby obtain a fibrous product having an improved water dispersibility. As a result, the resin component and/or the sizing agent deposited on the fibrous product can be reduced, and the water dispersibility can be improved.

For the fibrous product obtained in the step (2) or (3), the deposition amount of the resin is preferably less than 1 mass % (the carbon fiber content is more than 99 mass %), and more preferably 0.1 mass % or less. However, this is not intended to be exclusive. The conditions of the steps (1) to (3) (the kind, the concentration, the temperature, and the time of the acid of the acidic aqueous solution of the step (1), the kind, the concentration, the temperature, and the time of the alkali of the alkaline aqueous solution of the step (2), the necessity of adoption of the step (3), and the kind, the concentration, the temperature, and the time of the acidic aqueous solution of the step (3)) are appropriately adjusted so that the deposition amount of the resin falls within the foregoing range.

The carbon fiber obtained in the step (2) or (3) is subjected to a neutralization treatment, washing, and drying. As a result, only the carbon fiber can be recovered. If required, washing may be repeated. For the desolvation treatment and the drainage treatment after neutralization of the dissolved carbon fiber, and the dehydration after washing of fiber, a centrifugal separator, a pressure press, a screw press, a belt press, a pressure filtration filter, a dryer of high-speed stirring or the like can be used alone, or in combination of a plurality thereof. At that time, the base material resin in the composite material is partially or fully separated by the shearing force during the treatment, or the like. Then, a carbon fiber can be obtained by the proper separating treatments mentioned above.

The carbon fiber manufactured by the method of the present invention can be used as the raw material for CFC as a recycled carbon fiber. Particularly, the carbon fiber manufactured by the method of the present invention has good dispersibility in water. For this reason, paper making can be performed as with the manufacturing method of a wet nonwoven fabric, and a carbon fiber sheet can be manufactured. Further, a carbon fiber can also be coated by being dispersed in an adhesive or a pressure-sensitive adhesive, an ink, a paint, or the like.

[Manufacturing Method of Carbon Fiber Reinforced Resin Composition]

The manufacturing method of a carbon fiber reinforced resin composition of the present invention comprises a step of manufacturing a carbon fiber by the method of the present invention described above, and a step of manufacturing a carbon fiber reinforced resin composition using the resulting carbon fiber.

The step of manufacturing a carbon fiber is as described previously. Further, using the carbon fiber herein obtained, a carbon fiber reinforced resin composition is manufactured. For the manufacturing method of a carbon fiber reinforced resin composition using the carbon fiber, a known method can be used as it is. The carbon fiber reinforced resin composition can be manufactured by either method of a manufacturing method for making a resin into a composite form after manufacturing a carbon fiber sheet, and a method for mixing a resin and a carbon fiber, and then, forming the mixture into a sheet shape.

The carbon fiber manufactured by the method of the present invention can be used as the raw material for a CFC as it is as a recycled carbon fiber. However, the carbon fiber to be recovered is in a wool shape, and has poor convergence property. For this reason, the carbon fiber can be bound by adjusting the dissolution amount of the resin according to the intended purpose or using a converging material.

As the converging materials, polyurethane type, epoxy type, epoxy urethane type, modified acrylic type, modified olefin type, phenol type, specific resin type, or water-soluble polymer, and the like can be used according to the kind of the resin to be combined.

The carbon fiber reinforced resin composition to be manufactured is, for example, a resin composition compris-ing a carbon fiber and a thermoplastic resin and/or a thermosetting resin, and can be a carbon fiber reinforced resin composition comprising a carbon fiber (A) in an amount of 5 to 95 mass %, and a thermoplastic resin and/or a thermosetting resin (B) in an amount of 5 to 95 mass % when the total amount of the carbon fiber (A) and the thermoplastic resin and/or a thermosetting resin (B) is taken as 100 mass %.

The recovered carbon fiber obtained in the present invention has an excellent mechanical strength by the manufacturing method of the present invention. Further, the present inventors have found that the carbon fiber reinforced resin composition obtained using the recovered carbon fiber of the present invention has a practically sufficient mechanical strength, and becomes an excellent structural material. Namely, it has been shown that mixing the recovered carbon fiber of the present invention and a thermoplastic resin and/or a thermosetting resin can provide a carbon fiber reinforced resin composition (CFRTP) excellent in mechanical strength and practical characteristics, and preferable for various uses, and structural materials.

The preferable aspect of the carbon fiber reinforced resin composition of the present invention is a carbon fiber reinforced thermoplastic resin composition. For the carbon fiber reinforced thermoplastic resin composition, for example, the thermoplastic resin is at least one thermoplastic resin selected from the group consisting of a polypropylene resin, a polyamide-based resin, a styrene-based resin, a polycarbonate-based resin, a polyester resin, a polyphenylene ether resin, a polyphenylene sulfide resin, a polyacetal resin, an acrylic resin, and a vinyl chloride resin.

Typical examples of polyolefin-based resins may include homopolymers of α-olefin such as ethylene, propylene, butene-1,3-methylbutene-1,3-methylpentene-1, and 4-methylpentene-1, or copolymers thereof, copolymers with unsaturated monomers copolymerizable therewith, or the like. Typical examples thereof may include polyethylenes such as metallocene-based ethylene-α-olefin copolymers including high density polyethylene, intermediate density polyethylene, low density polyethylene, straight-chain low density polyethylene, ultra-high molecular eight polyethylene, an ethylene-vinyl acetate copolymer, an ethylene-ethyl acrylate copolymer, an ethylene-octene-1 copolymer, and the like, polypropylenes such as atactic polypropylene, syndiotactic polypropylene, isotactic polypropylene or a propylene-ethylene block copolymer or a random copolymer, and polymethylpentene-1.

The polyamide-based resin is not particularly limited so long as it has an amide bond in the repeating structure of the polymer. As the polyamide-based resin, a thermoplastic polyamide resin is preferable, and the polyamide-based resin may be homopolyamide and copolyamide obtained by polymerizing monomers such as lactam, aminocarboxylic acid and/or diamine, and dicarboxylic acid, and mixtures thereof. Specific examples thereof may include polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polyundecamethylene adipamide (nylon 116), polybis(4-aminocyclohexyl)methane dodecamide (nylon PACM12), polybis(3-methyl-4-aminocyclohexyl)methane dodecamide (nylon dimethyl PACM12), polynonamethylene terephthalamide (nylon 9T), polydecamethylene terephthalamide (nylon 10T), polyundecamethylene terephthalamide (nylon 11T), polyundecamethylene hexahydroterephthalamide (nylon 11T(H)), polyundecamide (nylon 11), polydodecamide (nylon 12), polytrimethyl hexamethylene terephthalamide (nylon TMDT), polyhexamethylene terephthalamide (nylon 6T), polyhexamethylene isophthalamide (nylon 6I), polymetaxylylene adipamide (nylon MXD6), and copolymerized products and mixtures thereof. Out of these, from the viewpoints of the formability and the surface appearance, nylon 6, nylon 66, nylon MXD6, nylon 9T, nylon 10T, and copolymerized polyamides thereof are preferable. Nylon 9T, nylon 10T, and nylon MXD6 are more preferable, and nylon 9T is in particular preferable. Further, the thermoplastic polyamide resins are also practically preferably used as a mixture according to the required characteristics such as the impact resistance and the forming processability.

Examples of the polycarbonate-based resin may include 4,4'-dihydroxy diaryl alkane-based polycarbonates, Specific examples thereof may include bisphenol A-based polycarbonate (PC), modified bisphenol A-based polycarbonate, and flame-retardant bisphenol A-based polycarbonate.

Examples of the styrene-based resin may include homopolymers such as styrene and α-methyl styrene or copolymers thereof, or copolymers with unsaturated monomers copolymerizable therewith. Specific examples of the styrene-based resin may include general polystyrene (GPPS), impact resistant polystyrene (HIPS), heat-resistant polystyrene (e.g., α-methyl styrene polymer or copolymer), acrylonitrile-butadiene-styrene copolymer (ABS), acrylonitrile-butadiene-styrene-α-methyl styrene copolymer (α-methyl styrene-based heat-resistant ABS), acrylonitrile-butadiene-styrene-phenyl maleimide copolymer (phenyl maleimide-based e heat-resistant ABS), acrylonitrile-styrene copolymer (AS), acrylonitrile-chlorinated polystyrene-styrene-based copolymer (ACS), acrylonitrile-ethylene propylene rubber-styrene copolymer (AES), acrylic rubber-acrylonitrile-styrene copolymer (AAS), or syndiotactic polystyrene (SPS). Alternatively, a styrene-based resin may be polymer-blended.

Examples of a polyester-based resin may include those resulting from polycondensation of aromatic dicarboxylic acid and alkylene glycol such as ethylene glycol, propylene glycol, or butylene glycol. Specific examples thereof may include polyethylene terephthalate (PET), polypropylene terephthalate (PPT), and polybutylene terephthalate (PBT).

Examples of a polyphenylene ether-based resin (PPE) may include homopolymers such as poly(2,6-dimethyl-1,4-phenylene) ether, and poly(2-methyl-6-ethyl-1,4-phenylene) ether. Those obtained by modifying these with a styrene-based resin can also be used.

A polyphenylene sulfide resin is a highly heat-resistant crystalline polymer having a structure in which benzene and sulfur are alternately bonded, and is more often used by being mixed with a filler such as glass fiber, carbon fiber, silica, or talk than being used alone.

Examples of a polyacetal resin (POM) may include homopolymer polyoxymethylene or formaldehyde-ethylene oxide copolymer resulting from trioxane and ethylene oxide.

Examples of an acrylic resin may include methacrylic acid ester, acrylic acid ester homopolymer or copolymers thereof, or copolymers with unsaturated monomers copolymerizable therewith. Examples of methacrylic acid ester, and acrylic acid ester monomers may include methyl, ethyl, n-propyl, isopropyl, or butyl ester of methacrylic acid or acrylic acid, and the like. Typical examples thereof may include methacrylic resin (PMMA). The thermoplastic resins may be used alone, or may be used in combination of two or more thereof.

Examples of a polyvinyl chloride-based resin may include vinyl chloride homopolymer and copolymers with unsaturated monomers copolymerizable with vinyl chloride. Specifically, a vinyl chloride-acrylic acid ester copolymer, a vinyl chloride-methacrylic acid ester copolymer, a vinyl chloride-ethylene copolymer, a vinyl chloride-propylene copolymer, a vinyl chloride-vinyl acetate copolymer, a vinyl chloride-vinylidene chloride copolymer, and the like. Alternatively, those obtained by chlorinating the polyvinyl chloride-based resins, and increasing the chlorine content can also be used.

Another aspect of the carbon fiber reinforced resin composition of the present invention is a carbon fiber reinforced thermosetting resin composition. Examples of the thermosetting resin may include at least one selected from the group consisting of an epoxy resin, a phenol resin, a melamine resin, urea resin, a diallyl phthalate resin, and an unsaturated polyester resin. The carbon fiber of the present invention is well dispersed in water, and, when it is subjected to paper making at a proper concentration, a wet nonwoven fabric, specifically, a thin carbon fiber sheet or carbon fiber paper can be obtained. When the resulting carbon fiber nonwoven fabric is mixed or impregnated with a thermosetting resin before curing, followed by curing by a heat or the like, a carbon fiber reinforced thermosetting resin composition having more excellent mechanical physical properties than ever can be obtained.

Further, to the carbon fiber reinforced resin composition of the present invention, fillers such as glass fiber, silica, and talk, and various flame retarders such as a phosphorus compound, a bromine compound, an antimony compound, a metal oxide, and a nitrogen compound can be added other than a thermoplastic resin according to the intended purpose. Further, other than the additives, various additives such as a flowability improver and a formability improver of a molten resin to be added to a general thermoplastic resin composition, and an impact resistance improver such as a rubber-based filler or a thermoplastic elastomer, and a matting agent for exerting the matting effect of the surface can be added in a proper amount.

EXAMPLES

Below, the present invention will be further described in details based on examples. However, examples are illustrative of the present invention. It is not intended that the present invention is limited to the examples.

Example 1

Step (1)

Figure 1:
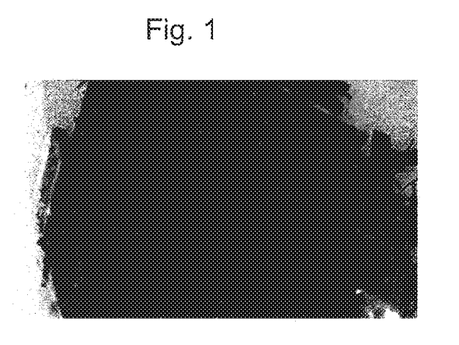
FIG. 1 shows a photograph of a carbon fiber in a used tea leaf shape (sample No. 1) obtained by the present invention.

Concentrated nitric acid diluted to 6 M was placed in a reaction vessel, heated to 60° C. to 70° C. in water bath, and was pretreated with stirring in a sodium hydrogen carbonate aqueous solution for every 100 parts by mass of nitric acid. Cut uncured prepregs were added thereto in an amount of 10 to 20 parts by mass, and heating and stirring were performed for 10 to 20 minutes. The internal temperature was kept at 30° C. or less although heat generation may be involved. The reactant was taken out from nitric acid, and immediately was released in water, to obtain a brown carbon fiber resulting from dissolution of a part of an epoxy resin. Note that concentrated nitric acid may be a mixed acid obtained by being mixed with sulfuric acid at a given ratio in order to enhance the oxidizing power (Table 1-1, sample Nos. 1 and 2, and FIG. 1). Further, a cured prepreg was added in an amount of 30 parts for every 100 parts by mass of the mixed acid, and the resulting mixture was heated and immersed for 120 hours, to obtain a fibrous carbon fiber in which most part of the epoxy resin was dissolved (Table 1-1, sample No. 3).

TABLE 1-1

Raw materials were separated into an uncured prepreg layer and a cured prepreg layer

| Sample No. | Carbon fiber reinforced plastic (CFRP) Kind and composition (wt ratio) | Addition amount (g) | Acid dissolution step 6M nitric acid (g) | 4M sulfuric acid (g) | Reaction temperature (°C.) | Reaction time (hour) | Shape of resulting decomposed matter |
|---|---|---|---|---|---|---|---|
| 1 | Uncured prepreg carbon fiber/epoxy resin = 60/40 | 10 | 100 | 0 | 80 | 0.2 | Partially dissolved |
| 2 | Same as above | 20 | 120 | 40 | 80 | 1 | Same as above |
| 3 | Cured prepreg carbon fiber/epoxy resin = 60/40 | 30 | 120 | 40 | 80 | 120 | Fibrous |

Step (2)

Figure 2:
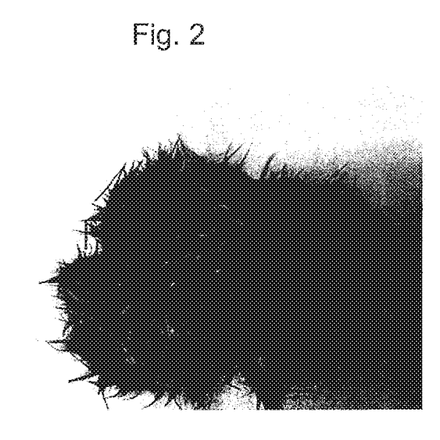
FIG. 2 shows a photograph of a carbon fiber in a wool shape (sample No. 4) obtained by the present invention.

Then, carbon fibers of sample Nos. 1 to 3 were added in respective amounts of respective 10 parts for every 100 parts of the alkaline aqueous solutions with respective compositions shown in Table 1-2, and the resulting mixture was stirred, to obtain a carbon fiber in a fiber-opened wool shape in which most of the epoxy resin is dissolved (Table 1-2 and FIG. 2).

TABLE 1-2

Dissolution with acid, followed by alkali treatment

| Sample No. | Sample contents and addition amount (g) after acid dissolution step | Alkali dissolution step 10% sodium hydroxide (g) | 5% sodium hydrogen carbonate (g) | 10% sodium sulfite (g) | Shape of resulting dissolved matter | Resin residue on carbon fiber surface | Fiber dispersibility in water |
|---|---|---|---|---|---|---|---|
| 4 | 10 g of 1 | 100 | 0 | 0 | Fibrous | Slightly present | Good |
| 5 | 10 g of 2 | 90 | 10 | 0 | Same as above | Slightly present | Good |
| 6 | 10 g of 3 | 80 | 0 | 20 | Same as above | Slightly present | Good |

TABLE 1-3

Alkali treatment, followed by sulfuric acid treatment

| Sample No. | Acid immersion treatment 40% Sulfuric acid (g) | Shape of resulting dissolved matter | Resin residue on carbon fiber surface | Fiber dispersibility in water |
|---|---|---|---|---|
| 4 | 100 | Fibrous | None | Better |
| 5 | 100 | Same as above | None | Better |
| 6 | 100 | Same as above | None | Better |

As indicated by the results shown in Table 1-2, with the present method, using heated nitric acid first and then using sodium hydroxide, dissolution of the epoxy resin was gradually performed. As a result, it was possible to dissolve most of each epoxy resin included in the uncured prepregs (Nos. 1 and 2) and the cured prepreg (No. 3), but a resin residue was slightly observed at the carbon fiber surface.

When first, not an acid but an alkaline aqueous solution was used, the epoxy resin was not dissolved, and a wool-shaped carbon fiber cannot be obtained. However, the interlayer adhesion between the stacked uncured prepregs receives an action, so that it becomes possible to easily release the prepregs one by one. For this reason, this method is very useful as the pretreatment method of the discarded material (to be carried out prior to the step (1)). Accordingly, with the present method, as the pretreatment agent of the uncured prepreg, a sodium hydrogen carbonate aqueous solution with weak alkalinity is used, and immersion is performed for several minutes to several days. As a result, it also becomes possible to facilitate releasing of the prepregs.

As indicated by the results shown in Table 1-3, the carbon fiber formed into a wool shape due to gradual elution of the resin component using nitric acid, then sodium hydroxide was further immersed in dilute sulfuric acid. Accordingly, the undissolved epoxy resin and sizing agent were eluted. As a result, it was possible to remove the resin residue slightly observed on the carbon fiber surface.

With the present method, each carbon fiber obtained in Tables 1-2 and 1-3 includes a large amount of colored solution and may swell according to conditions. For this reason, using various dehydrators, washers, and the like, dehydration and washing can also be performed. Alternatively, an alkaline aqueous solution such as sodium hydroxide or sodium sulfite can also be used as a washing solution.

Comparative Example

In accordance with the method described in Patent Literature, a recovered carbon fiber a, prepared. The results are shown in Table 1-3. In accordance with the method described in PTL 6, a recovered carbon fiber was prepared. The results are shown in Table 1-5.

TABLE 1-4

Thermal decomposition method

| Sample No. | Carbon fiber reinforced plastic (CFRP) Type and composition (wt ratio) | Addition amount (g) | Heating and burning Reaction temperature (° C.) | Reaction time (hour) | Shape of resulting dissolved matter | Resin residue on carbon fiber surface | Dispersibility |
|---|---|---|---|---|---|---|---|
| 7 | Uncured prepreg carbon fiber/epoxy resin = 60/40 | 10 | 400 | 1.5 | Fibrous | Present (large amount) | Bad |
| 8 | Uncured prepreg carbon fiber/epoxy resin = 60/40 | 10 | 450 | 0.5 | Same as above | Present | Bad |
| 9 | Uncured prepreg carbon fiber/epoxy resin = 60/40 | 10 | 500 | 1 | Same as above | Same as above | Bad |
| 10 | Cured prepreg carbon fiber/epoxy resin = 60/40 | 10 | 550 | 0.5 | Same as above | Same as above | Bad |

TABLE 1-5

Without alkali dissolution step (Reference example)

| Sample No. | Sample contents and addition amount (g) after acid dissolution step | Alkali dissolution step 10% Sodium hydroxide (g) | 5% Sodium hydrogen carbonate (g) | 10% Sodium sulfite (g) | Acid immersion treatment 40% Sulfuric acid (g) |
|---|---|---|---|---|---|
| 11 | 10 g of 1 | 0 | 0 | 0 | 100 |

| Sample No. | Shape of resulting dissolved matter | Resin residue on carbon fiber surface | Fiber dispersibility in water |
|---|---|---|---|
| 11 | Partial dissolution | Present (large amount) | Very bad |

TABLE 1-6

Electrolysis method

| Sample No. | Carbon fiber reinforced plastic (CFRP) Type and composition (wt ratio) | Addition amount (g) | Heating and burning Reaction temperature (° C.) | Reaction time (hour) |
|---|---|---|---|---|
| 12 | Uncured prepreg carbon fiber/epoxy resin = 60/40 | 10 | 450 | 0.5 |

TABLE 1-6-continued

Electrolysis method

| Sample No. | Electrolysis (anodic oxidation) Reaction time (hour) | Applied voltage (V) | Current density (A/m$^2$) | Resin residue on carbon fiber surface | Dispersibility |
|---|---|---|---|---|---|
| 12 | 2 | 4.5 | 0.3 | Present | Bad |

Physical Property Test 1 (Dispersibility Test)

The dispersibility of the carbon fiber in water was compared by the one obtained by stirring 1 g of carbon fiber in 1000 mL of water at 8000 rpm for 1 minute using a homogenizer.

Table 1-4 shows the burning conditions and the test results of the dispersibility of the carbon fiber samples (Nos. 7, 8, 9, and 10) obtained by a thermal decomposition method. The dispersibility of every sample was not good.

Table 1-5 shows the test results of the carbon fiber sample (No. 11) obtained without performing the alkali dissolution step. The carbon fiber did not become in a wool shape, and the dispersibility was very bad.

Table 1-6 shows the results of the electrolysis conditions and the dispersibility of the carbon fiber sample (No. 12) obtained by an electrolysis method. Also in this case, the dispersibility was not good.

Figure 3:
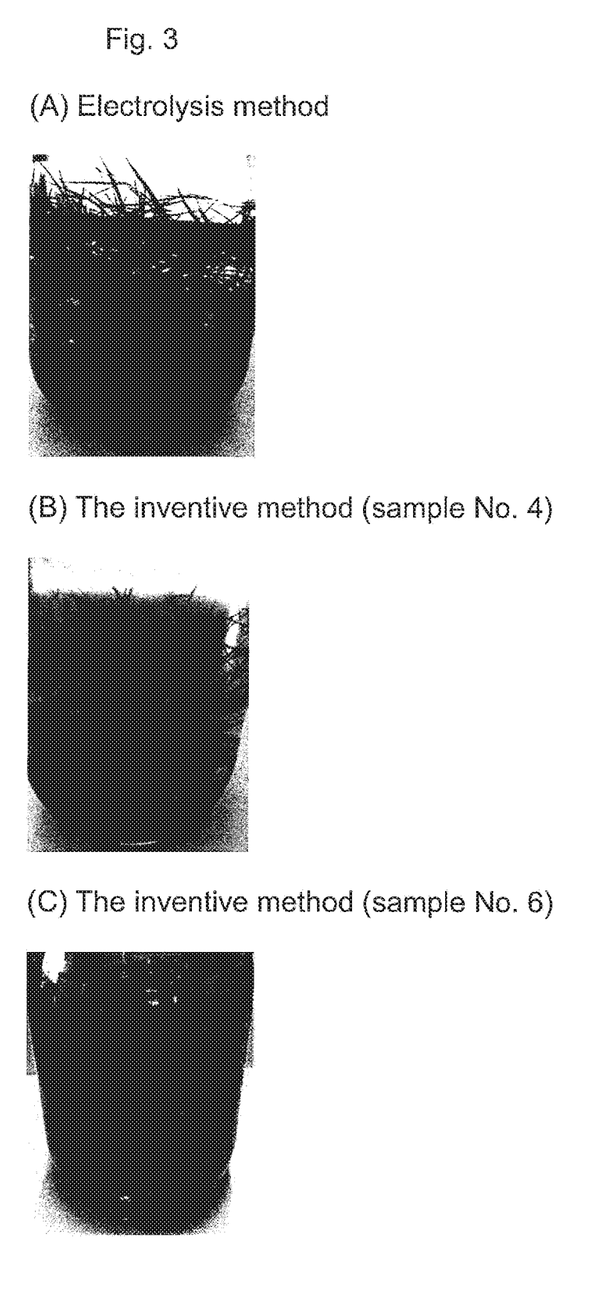
FIG. 3 shows the dispersibility in water of the carbo fibers obtained by the present invention and the electrolysis method, (A) the electrolysis method, (B) the present method (sample No. 4), and (C) the present method (sample No. 6).

The carbon fiber obtained by the present method was more excellent in dispersibility than the carbon fibers by a thermal decomposition method and an electrolysis method (FIG. 3).

Physical Property Test 2 (Observation of Surface Resin Residue)

The carbon fiber was observed by a scanning electron microscope, and whether the resin residue on the carbon fiber surface was present or not was confirmed.

Figure 4:
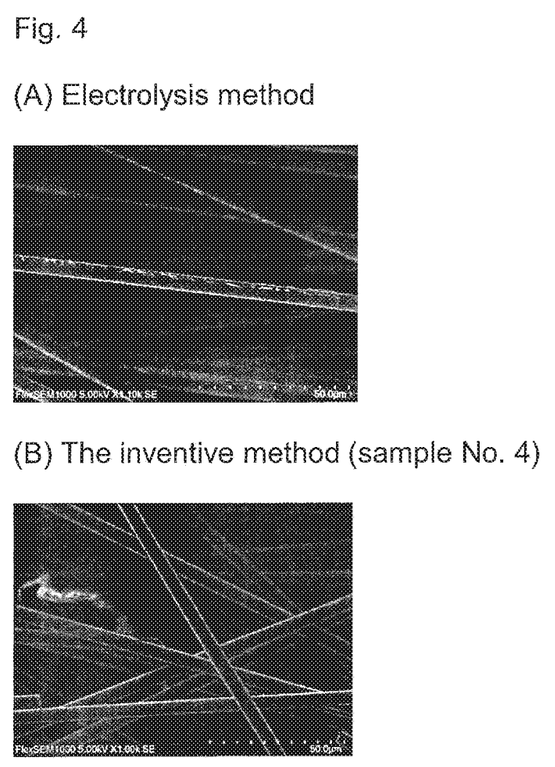
FIG. 4 shows photographs by SEM of the carbon fibers obtained by the present invention and the electrolysis method, (A) the electrolysis method, and (B) the present method (sample No. 4).

FIG. 4 shows photographs of the surface conditions of the carbon fibers obtained by an electrolysis method and the present method. It was observed that the carbon fiber obtained by an electrolysis method included a resin left on the surface thereof. However, the surface condition of the carbon fiber obtained by the present method was very clean, and no residual resin was observed. Accordingly, full removal of the residual resin is considered to be effective for improving the dispersibility.

Example 2

Using carbon fiber samples of Table 1-3 to Table 1-6, compositions with PP (carbon fiber composite material sheet) were formed with a paper-making method.

As a method for manufacturing a carbon fiber composite material sheet, the present carbon fibers (average fiber length 6 mm) in Table 1-3 to Table 1-6 and a PP fiber having a fiber length comparable thereto were first mixed, and dispersed in water, to thereby prepare a slurry for paper making including a solid content of 0.1% to 3.0%. Then, as a dispersant, 0.00002 parts by weight of anionic sodium polyacrylate was added thereto. Then, the carbon fiber dispersion solution was deposited on the paper making surface using a hand-made paper machine with a mesh aperture of 0.3 mm, and was formed into a sheet. The resulting sheet was pressurized and heated (heated under pressure) at 5 MPa and 200° C., to obtain a carbon fiber composite material sheet. Then, a test piece for various mechanical measurements was formed.

Example 3

Appropriate samples were selected from respective carbon fiber samples of Table 1-3 to Table 1-6, and compositions with respective thermoplastic resin shown in Table 2 were formed.

The formation was performed in the following manner: for 70 to 90 mass % thermoplastic resins, 10 to 30 mass % converged recovered carbon fibers were separately weighed. Then, with a biaxial extruder ZE40A manufactured by KraussMaffei Berstorff GrnbH, both materials were kneaded and extruded under the temperature conditions of the melting temperature of a thermoplastic resin. Note that, for the sample including a large amount of carbon fiber added therein, the regenerated carbon fiber was added by side feeding from midway of the extruder screw. Further, for the sample, the sample bound to a length of about 1 to 3 cm was used.

The resulting pellet was subjected to injection molding under the optimum forming conditions for each thermoplastic resin using a F85 injection molding machine manufactured by Lockner Co., to thereby form a test piece for various mechanical measurements.

Physical Property Test 3 (Mechanical Physical Property Test)

The results of the mechanical physical properties of respective thermoplastic resin compositions formed from Examples 2 and 3 are shown in Table 2 below (Example 2: sample Nos. 101 to 106, Example 3: sample Nos. 107 to 130).

The thermoplastic resin compositions formed using the carbon fibers obtained by the present method were compared with the carbon fibers obtained by an electrolysis method and a thermal decomposition method, and the resin compositions formed using an intermediate modulus virgin carbon fiber, and all samples had a high strength.

TABLE 2

| Sample No. | Section | Resin | CF sample No. | CF addition amount (mass %) |
|---|---|---|---|---|
| 101 | Example | Polypropylene | 4 | 25 |
| 102 | Same as above | Same as above | 5 | Same as above |
| 103 | Comparative example | Same as above | 7 | Same as above |
| 104 | Same as above | Same as above | 8 | Same as above |
| 105 | Same as above | Same as above | 12 | Same as above |
| 106 | Same as above | Same as above | Toray Industries, Inc., T010-006 | Same as above |
| 107 | Example | 66 Nylon | 4 | 30 |
| 108 | Same as above | Same as above | 6 | Same as above |
| 109 | Comparative example | Same as above | 9 | Same as above |
| 110 | Same as above | Same as above | 11 | Same as above |
| 111 | Same as above | Same as above | Toray Industries, Inc., TV14-006 | Same as above |
| 112 | Example | Polycarbonate (PC) | 4 | 10 |

TABLE 2-continued

| | | | | |
|---|---|---|---|---|
| 113 | Same as above | Same as above | 5 | Same as above |
| 114 | Comparative example | Same as above | 10 | Same as above |
| 115 | Same as above | Same as above | 12 | Same as above |
| 116 | Same as above | Same as above | Toray Industries, Inc., TV14-006 | Same as above |
| 117 | Example | ABS | 4 | 20 |
| 118 | Comparative example | Same as above | 7 | Same as above |
| 119 | Example | PBT | 5 | Same as above |
| 120 | Comparative example | Same as above | 12 | Same as above |
| 121 | Example | Polyphenylene sulfite (PPS) | 6 | 15 |
| 122 | Comparative example | Same as above | 8 | Same as above |
| 123 | Example | Polyphenylene ether/polystyrene = 60/40 mass ratio | 4 | 25 |
| 124 | Comparative example | Same as above | 9 | Same as above |
| 125 | Example | Polyoxymethylene (polyacetal) | 6 | 10 |
| 126 | Comparative example | Same as above | 12 | Same as above |
| 127 | Example | Acrylic resin | 4 | 10 |
| 128 | Comparative example | Same as above | 7 | Same as above |
| 129 | Example | Vinyl chloride resin | 5 | 10 |
| 130 | Comparative example | Same as above | 8 | Same as above |

| Sample No. | Tensile break strength (MPa) | Flexural strength (MPa) | Flexural modulus (MPa) | CF preparation method contents | Resin residue on carbon fiber surface | Paper making suitability |
|---|---|---|---|---|---|---|
| 101 | 258 | 264 | 22,000 | the present invention | None | Good |
| 102 | 250 | 256 | 21,800 | Same as above | None | Good |
| 103 | 168 | 175 | 13,400 | Thermal decomposition method | Present | Bad |
| 104 | 159 | 167 | 12,900 | Same as above | Present | Bad |
| 105 | 225 | 228 | 17,900 | Electrolysis method | Present | Bad |
| 106 | 201 | 208 | 16,200 | Virgin | None | Good |
| 107 | 266 | 381 | 21,200 | The present invention | None | — |
| 108 | 276 | 375 | 21,900 | Same as above | None | — |
| 109 | 198 | 286 | 16,500 | Thermal decomposition method | Present | — |
| 110 | 205 | 302 | 17,700 | Outside the present invention | Present | — |
| 111 | 247 | 341 | 19,400 | Virgin | — | — |
| 112 | 118 | 163 | 7,100 | The present invention | None | — |
| 113 | 120 | 168 | 7,050 | Same as above | None | — |
| 114 | 86 | 114 | 4,860 | Thermal decomposition method | Present | — |
| 115 | 99 | 125 | 6,200 | Electrolysis method | Present | — |
| 116 | 95 | 122 | 6,100 | Virgin | — | — |
| 117 | 130 | 168 | 12,200 | The present invention | None | — |
| 118 | 91 | 124 | 9,800 | Thermal decomposition method | Present | — |

TABLE 2-continued

| | | | | | | |
|---|---|---|---|---|---|---|
| 119 | 135 | 178 | 12,400 | The present invention | None | — |
| 120 | 121 | 163 | 11,600 | Electrolysis method | Present | — |
| 121 | 168 | 240 | 12,600 | The present invention | None | — |
| 122 | 117 | 169 | 10,300 | Thermal decomposition method | Present | — |
| 123 | 116 | 223 | 10,800 | The present invention | None | — |
| 124 | 88 | 121 | 7,500 | Thermal decomposition method | Present | — |
| 125 | 108 | 144 | 8,100 | The present invention | None | — |
| 126 | 94 | 132 | 7,900 | Electrolysis method | Present | — |
| 127 | 125 | 230 | 10,200 | The present invention | None | — |
| 128 | 89 | 136 | 6,700 | Thermal decomposition method | Present | — |
| 129 | 93 | 165 | 10,500 | The present invention | None | — |
| 130 | 62 | 102 | 6,800 | Thermal decomposition method | Present | — |

With the present method, a heat treatment at high temperatures is not performed. For this reason, the carbon fiber obtained by the present method is not deteriorated by a heat. Further, the discarded material of a high-modulus type carbon fiber is used. For this reason, a recycled carbon fiber can be obtained while keeping the high strength and at a low cost.

INDUSTRIAL APPLICABILITY

The present invention is useful for the technical field regarding a CFC.

What is claimed is:

1. A method for manufacturing a carbon fiber, comprising:
   a step (1) of immersing a carbon fiber composite material (CFC) in an acidic aqueous solution to elute at least a part of a resin component of the CFC, to thereby obtain a substantially fibrous product; and
   a step (2) of immersing the substantially fibrous product obtained in the step (1) in an alkaline aqueous solution to elute at least a part of a resin component of the substantially fibrous product, to thereby obtain a fibrous product.

2. The manufacturing method according to claim 1, wherein the elution amount of the resin component in the step (1) falls within the range of 0.1 to 99.9 when the mass of the CFC before immersion is taken as 100.

3. The manufacturing method according to claim 1, wherein the elution amount of the resin component in the step (2) falls within the range of 0.1 to 99.9 when the mass of the CFC before immersion is taken as 100.

4. The manufacturing method according to claim 1, wherein a part of or the whole of the substantially fibrous product is fibrous.

5. The manufacturing method according to claim 1, wherein the CFC is an uncured prepreg or a cured prepreg.

6. The manufacturing method according to claim 1, wherein the CFC is an uncured prepreg and is immersed in the acidic aqueous solution until a part of the uncured prepreg is decomposed into a fibrous state in the step (1), to thereby obtain a substantially fibrous product.

7. The manufacturing method according to claim 1, wherein the CFC is a cured prepreg, and is immersed in an acidic aqueous solution until the whole of the cured prepreg is decomposed into a fibrous state in step (1), to thereby obtain a substantially fibrous product.

8. The manufacturing method according to claim 1, further comprising a step (3) of immersing the fibrous product obtained in the step (2) in an acidic aqueous solution to elute further a resin component and/or a sizing agent deposited on the fibrous product, to thereby obtain a fibrous product improved in water dispersibility.

9. A method for manufacturing a carbon fiber reinforced resin composition, comprising the steps of: manufacturing a carbon fiber by the method according to claim 1; and manufacturing a carbon fiber reinforced resin composition using the resulting carbon fiber.

10. The manufacturing method according to claim 9, wherein the carbon fiber reinforced resin composition is a resin composition comprising a carbon fiber, and a thermoplastic resin and/or a thermosetting resin, the carbon fiber reinforced resin composition comprising a carbon fiber (A) in an amount of 5 to 95 mass %, and a thermoplastic resin and/or a thermosetting resin (B) in an amount of 5 to 95 mass % when the total amount of the carbon fiber (A) and the thermoplastic resin and/or thermosetting resin (B) is taken as 100 mass %.

11. The manufacturing method according to claim 10, wherein the thermoplastic resin is at least one selected from the group consisting of polyolefin-based resins, polyamide-based resins, styrene-based resins, polycarbonate-based resins, polyester-based resins, polyphenylene ether resins, polyphenylene sulfide resins, polyacetal resins, acrylic resins, and vinyl chloride resins.

12. The manufacturing method according to claim 10, wherein the thermosetting resin is at least one selected from the group consisting of epoxy resins, phenol resins, melamine resins, urea resins, diallyl phthalate resins, and unsaturated polyester resins.

* * * * *